US012669923B2

(12) United States Patent
Chang et al.

(10) Patent No.: US 12,669,923 B2
(45) Date of Patent: Jun. 30, 2026

(54) METHOD, APPARATUS, ELECTRONIC DEVICE AND STORAGE MEDIUM FOR DISPLAY CONTROLLING

(71) Applicant: Beijing Zitiao Network Technology Co., Ltd., Beijing (CN)

(72) Inventors: Weiyi Chang, Beijing (CN); Yaping Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/942,997

(22) Filed: Nov. 11, 2024

(65) Prior Publication Data

US 2025/0068311 A1 Feb. 27, 2025

Related U.S. Application Data

(63) Continuation of application No. PCT/CN2023/106793, filed on Jul. 11, 2023.

(30) Foreign Application Priority Data

Jul. 13, 2022 (CN) ........................ 202210828146.X

(51) Int. Cl.
*G06F 3/04842* (2022.01)
*G06F 3/0483* (2013.01)

(52) U.S. Cl.
CPC ........ *G06F 3/04842* (2013.01); *G06F 3/0483* (2013.01)

(58) Field of Classification Search
CPC ..................... G06F 3/04842; G06F 3/0483
See application file for complete search history.

(56) References Cited

U.S. PATENT DOCUMENTS

| 10,198,245 B1 * | 2/2019 | Jaeger ................... G06F 3/0485 |
| 2011/0087992 A1 | 4/2011 | Wang et al. |

(Continued)

FOREIGN PATENT DOCUMENTS

| CN | 107111429 A | 8/2017 |
| CN | 109669617 A | 4/2019 |

(Continued)

OTHER PUBLICATIONS

"Android: Detecting a Pinch Gesture" retrieved from—https://medium.com/@ali.muzaffar/android-detecting-a-pinch-gesture-64a0a0ed4b41 (Year: 2015).*

(Continued)

*Primary Examiner* — Pei Yong Weng
(74) *Attorney, Agent, or Firm* — Alleman Hall LLP

(57) ABSTRACT

Embodiments of the disclosure provide a method, apparatus, electronic device, and storage medium for display controlling. The method comprises: displaying a target media content and a first control corresponding to the target media content on a media content display page, wherein the first control is configured to indicate a display progress of the target media content; adjusting, in response to a sliding operation acting within the media content display page, at least one of a position of at least one element in the first control or a display size of an object to be adjusted, the object to be adjusted including at least one of: at least one element of the first control, or a target image of the target media content that is currently displayed within the media content display page, wherein the first control includes at least one element.

17 Claims, 6 Drawing Sheets

Display a target media content and a first control corresponding to the target media content on a media content display page, wherein the first control is used for indicating a display progress of the target media content — S101

Adjust, in response to a sliding operation acting within the media content display page, a position of at least one element in the first control and/or a display size of an object to be adjusted, the object to be adjusted including at least one element of the first control and/or a target image of the target media content currently displayed within the media content display page, wherein the first control includes at least one element — S102

(56)     References Cited

U.S. PATENT DOCUMENTS

| | | | |
|---|---|---|---|
| 2012/0127107 A1 | 5/2012 | Miyashita et al. | |
| 2012/0197998 A1* | 8/2012 | Kessel | H04L 67/1095 |
| | | | 709/205 |
| 2015/0177933 A1* | 6/2015 | Cueto | G06F 3/0485 |
| | | | 715/776 |
| 2016/0378237 A1* | 12/2016 | Zou | G06F 3/04883 |
| | | | 345/173 |
| 2017/0139556 A1 | 5/2017 | Josephson | |
| 2018/0376224 A1* | 12/2018 | Chun | G06F 16/58 |
| 2019/0370545 A1 | 12/2019 | Josephson et al. | |

FOREIGN PATENT DOCUMENTS

| | | | |
|---|---|---|---|
| CN | 110958481 | A | 4/2020 |
| CN | 111046205 | A | 4/2020 |
| CN | 111666027 | A | 9/2020 |
| CN | 111930996 | A | 11/2020 |
| CN | 114093005 | A | 2/2022 |
| CN | 115079917 | A | 9/2022 |
| JP | 2012058858 | A | 3/2012 |
| JP | 2017224967 | A | 12/2017 |
| WO | 2022143971 | A1 | 7/2022 |

OTHER PUBLICATIONS

China National Intellectual Property Administration, Search Report
Issued in Application No. 202210828146X Jul. 13, 2022, 1 page.
ISA China National Intellectual Property Administration, Interna-
tional Search Report Issued in Application No. PCT/CN2023/
106793, Jul. 11, 2023, 3 pages.
European Patent Office, Extended European Search Report Issued in
Application No. 23838942.3, Jun. 20, 2025, 10 pages.

* cited by examiner

Display a target media content and a first control corresponding to the target media content on a media content display page, wherein the first control is used for indicating a display progress of the target media content     S101

Adjust, in response to a sliding operation acting within the media content display page, a position of at least one element in the first control and/or a display size of an object to be adjusted, the object to be adjusted including at least one element of the first control and/or a target image of the target media content currently displayed within the media content display page, wherein the first control includes at least one element     S102

FIG. 1

Target media content

| Elem -ent1 | Elem -ent2 | Elem- ent3 | Elem -ent4 | Elem -ent5 |

FIG. 2

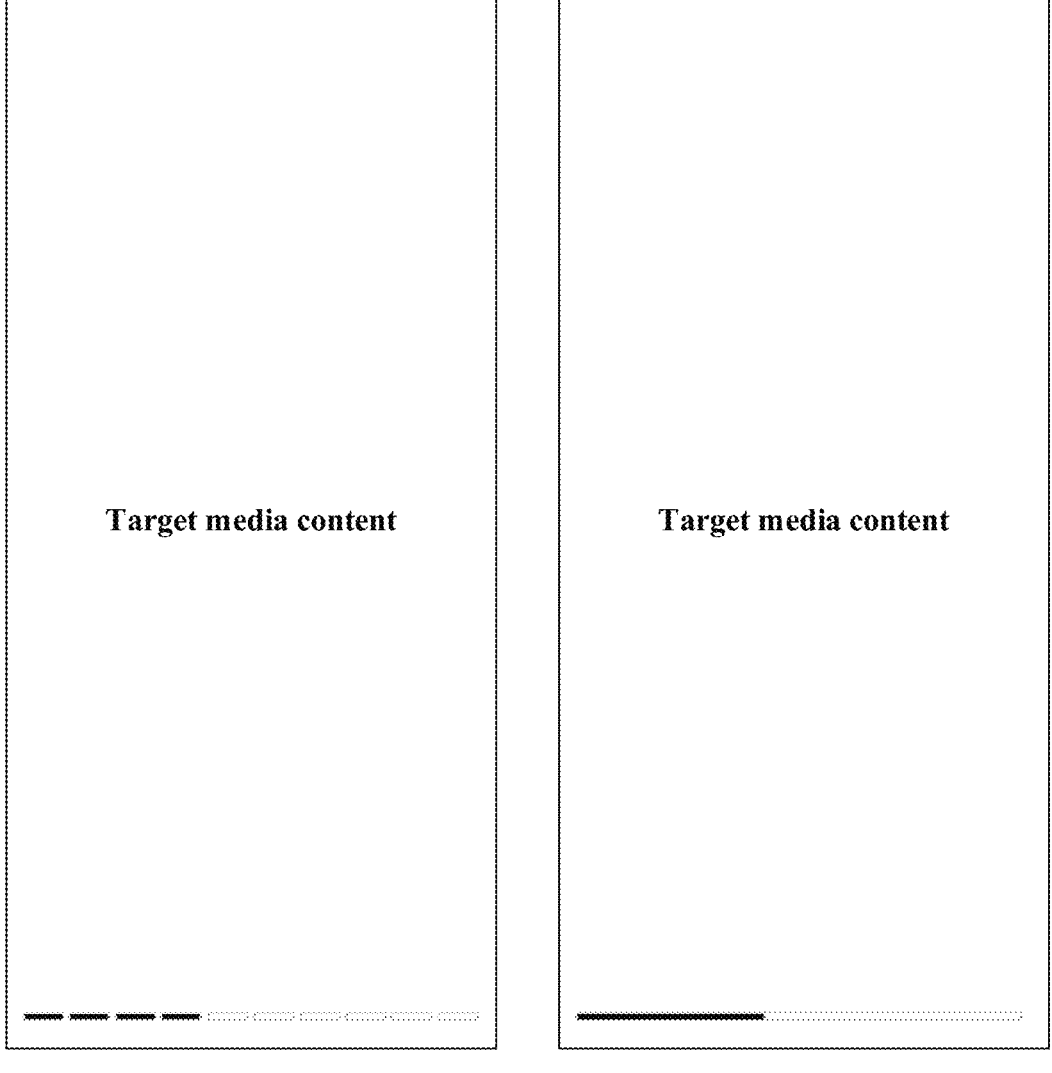
FIG. 3                    FIG. 4

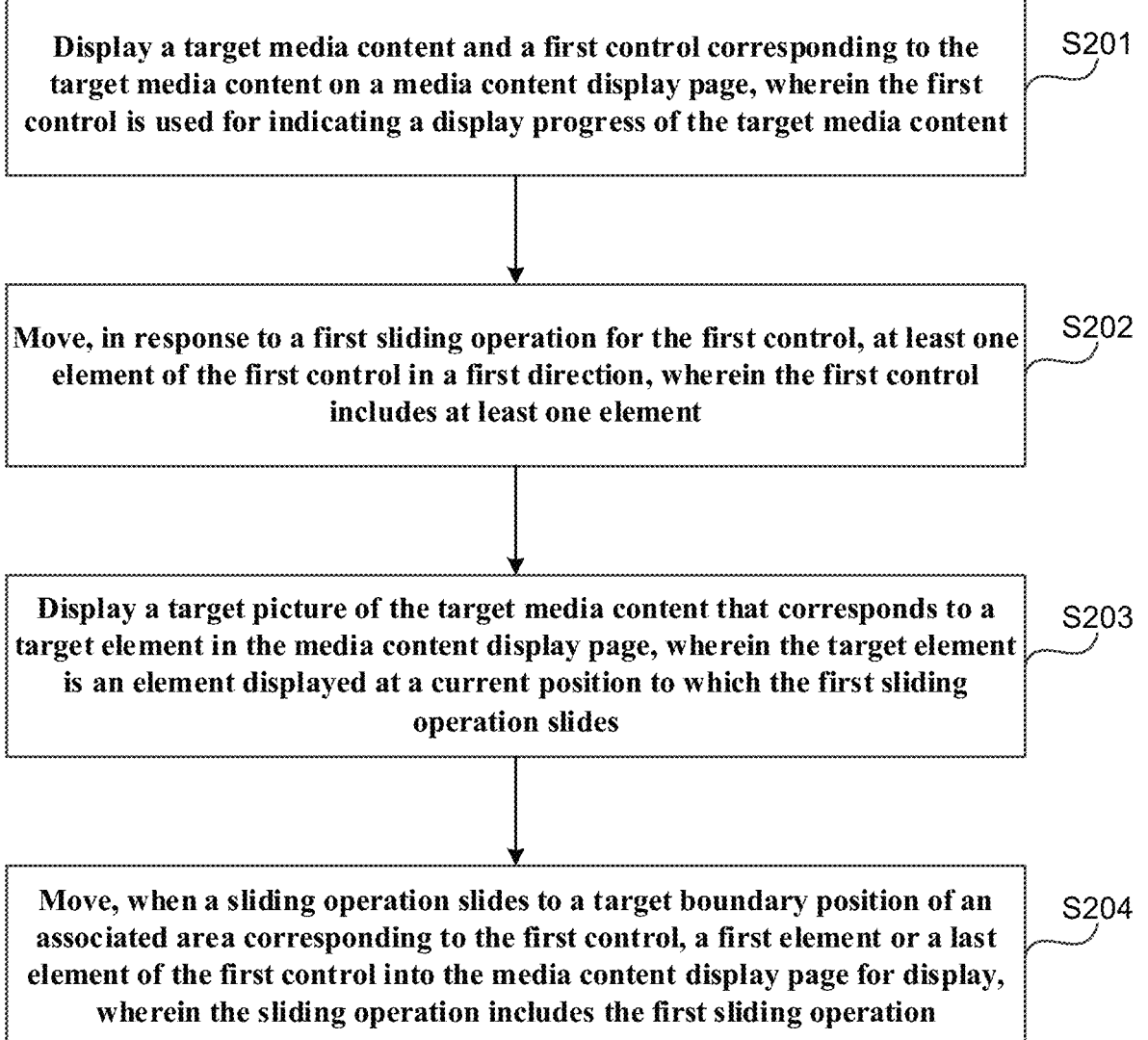

Display a target media content and a first control corresponding to the target media content on a media content display page, wherein the first control is used for indicating a display progress of the target media content — S201

Move, in response to a first sliding operation for the first control, at least one element of the first control in a first direction, wherein the first control includes at least one element — S202

Display a target picture of the target media content that corresponds to a target element in the media content display page, wherein the target element is an element displayed at a current position to which the first sliding operation slides — S203

Move, when a sliding operation slides to a target boundary position of an associated area corresponding to the first control, a first element or a last element of the first control into the media content display page for display, wherein the sliding operation includes the first sliding operation — S204

FIG. 5

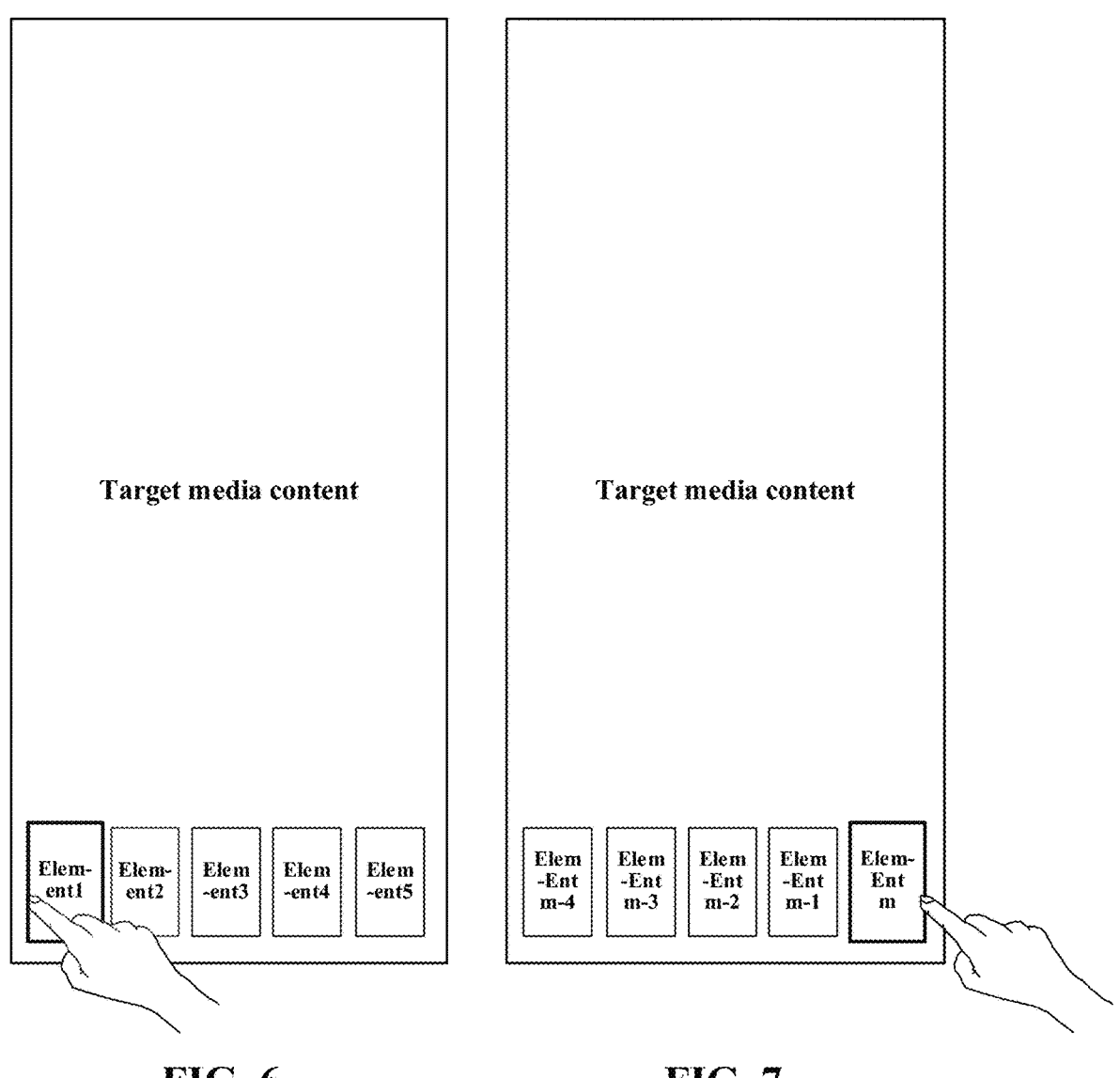
FIG. 6          FIG. 7

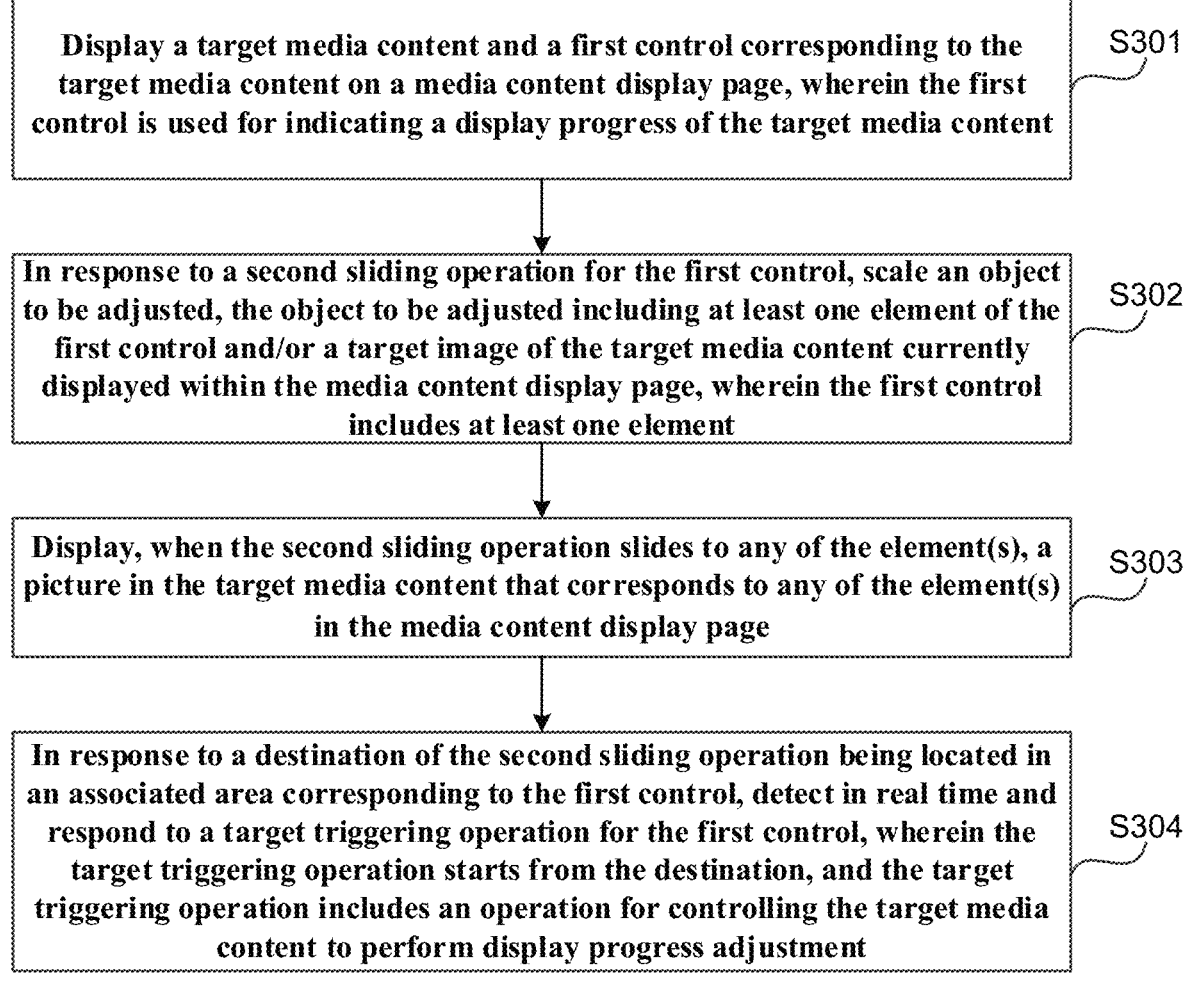

Display a target media content and a first control corresponding to the target media content on a media content display page, wherein the first control is used for indicating a display progress of the target media content — S301

In response to a second sliding operation for the first control, scale an object to be adjusted, the object to be adjusted including at least one element of the first control and/or a target image of the target media content currently displayed within the media content display page, wherein the first control includes at least one element — S302

Display, when the second sliding operation slides to any of the element(s), a picture in the target media content that corresponds to any of the element(s) in the media content display page — S303

In response to a destination of the second sliding operation being located in an associated area corresponding to the first control, detect in real time and respond to a target triggering operation for the first control, wherein the target triggering operation starts from the destination, and the target triggering operation includes an operation for controlling the target media content to perform display progress adjustment — S304

FIG. 8

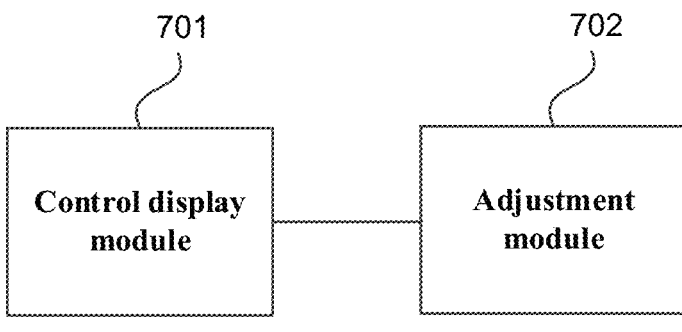

701

702

Control display module

Adjustment module

FIG. 9

METHOD, APPARATUS, ELECTRONIC DEVICE AND STORAGE MEDIUM FOR DISPLAY CONTROLLING

CROSS-REFERENCE TO RELATED APPLICATION(S)

This application is a Continuation Application of International Patent Application No. PCT/CN2023/106793, filed Jul. 11, 2023, which claims priority to Chinese Patent Application No. 202210828146. X, filed with the China Patent Office on Jul. 13, 2022, the disclosure of which is incorporated herein by reference in its entity.

FIELD

Embodiments in the disclosure relate to the field of computer technology, for example, to a method, apparatus, electronic device, and storage medium for display controlling.

BACKGROUND

Currently, a user can view or control media contents in a media content display page, such as adjusting the display progress or display size of the media contents.

However, in the related art, the media contents are controlled in a single manner and cannot meet the needs of users.

SUMMARY

Embodiments in the disclosure provide a method, apparatus, electronic device, and storage medium for display controlling.

In a first aspect, embodiments of the disclosure provide a method for display controlling comprising:

displaying a target media content and a first control corresponding to the target media content on a media content display page, wherein the first control is configured to indicate a display progress of the target media content;

adjusting, in response to a sliding operation acting within the media content display page, at least one of a position of at least one element in the first control or a display size of an object to be adjusted, the object to be adjusted including at least one of: at least one element of the first control, or a target image of the target media content that is currently displayed within the media content display page, wherein the first control includes at least one element.

In a second aspect, embodiments of the disclosure provide an apparatus for display controlling comprising:

a control display module configured to display a target media content and a first control corresponding to the target media content on a media content display page, wherein the first control is configured to indicate a display progress of the target media content;

an adjustment module configured to adjust, in response to a sliding operation acting within the media content display page, at least one of a position of at least one element in the first control or a display size of an object to be adjusted, the object to be adjusted including at least one of: at least one element of the first control, or a target image of the target media content that is currently displayed within the media content display page, wherein the first control includes at least one element.

In a third aspect, embodiments of the disclosure provide an electronic device comprising:

at least one processor; and a memory communicatively coupled to the at least one processor; wherein, the memory stores a computer program executable by the at least one processor to enable the at least one processor to implement a method for display controlling as described in embodiments of the disclosure.

In a fourth aspect, embodiments of the disclosure provide a computer-readable storage medium having stored thereon a computer program which, when executed by a processor, implements a method for display controlling as described in embodiments of the disclosure.

BRIEF DESCRIPTION OF THE DRAWINGS

Reference is made to the following detailed description taken in conjunction with the accompanying drawings. Throughout the drawings, the same or similar reference numerals indicate the same or similar elements. It should be understood that the drawings are schematic and that elements and components are not necessarily drawn to scale.

FIG. 1 is a schematic flowchart of a method for display controlling provided by an embodiment of the present disclosure;

FIG. 2 is a schematic display diagram of a first control provided by an embodiment of the present disclosure;

FIG. 3 is a schematic display diagram of a second control provided by an embodiment of the present disclosure;

FIG. 4 is a schematic display diagram of another second control provided by an embodiment of the present disclosure;

FIG. 5 is a schematic flowchart of another method for display controlling provided by an embodiment of the present disclosure;

FIG. 6 is a schematic display diagram of elements in a first control provided by an embodiment of the present disclosure;

FIG. 7 is a schematic display diagram of elements in another first control provided by an embodiment of the present disclosure;

FIG. 8 is a schematic flowchart of yet another method for display controlling provided by an embodiment of the present disclosure;

FIG. 9 is a block diagram of an apparatus for display controlling provided by an embodiment of the present disclosure;

DETAILED DESCRIPTION OF EMBODIMENTS

Figure 10:
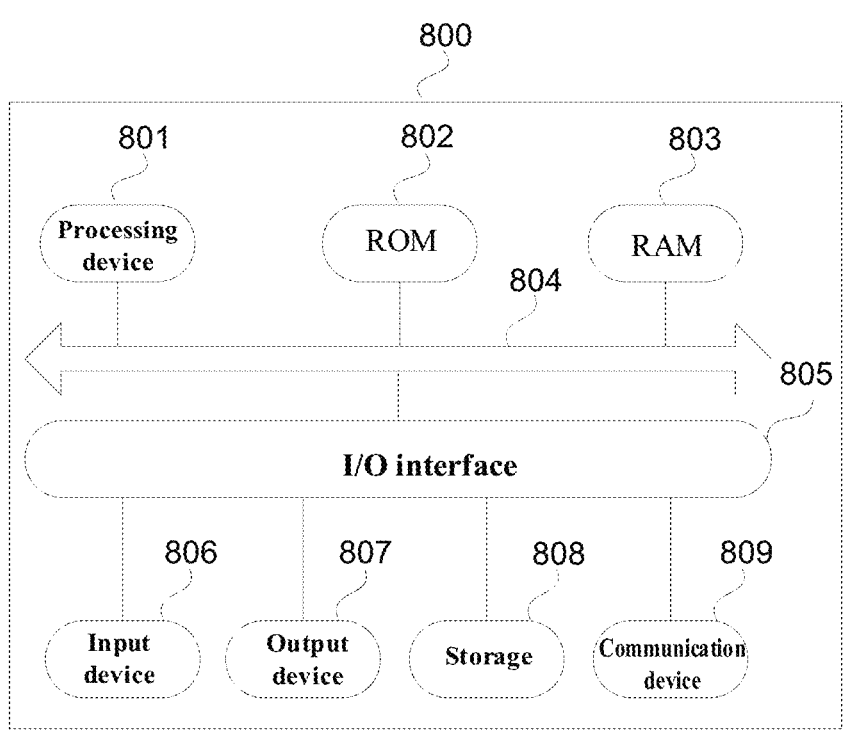
FIG. 10 is a block diagram of an electronic device provided by an embodiment of the present disclosure.

Hereinafter, embodiments of the present disclosure will be described in more detail with reference to the accompanying drawings. Although certain embodiments of the present disclosure have been illustrated in the accompanying drawings, it is to be understood that the disclosure may be embodied in various forms and that these embodiments are provided so that this disclosure will be thorough and complete. It should be understood that the drawings and examples of the present disclosure are for illustrative purposes only.

It should be understood that various steps recited in implementations of the method of the present disclosure may be performed in a different order and/or in parallel. Moreover, the implementations of the method may include additional steps and/or omit performing the steps shown.

As used herein, the terms "comprise", "include", and variations thereof are open-ended terms, i.e. "including, but not limited to". The term "based on" is "based, at least in part, on". The term "one embodiment" means "at least one embodiment"; the term "another embodiment" means "at least one further embodiment"; the term "some embodiments" means "at least some embodiments". Relevant definitions of other terms will be given in the following description.

It should be noted that references to "first", "second", and the like in the disclosure are merely used to distinguish one device, module, or unit from another.

It should be noted that references to "a", "an", and "a plurality of" in the disclosure are exemplary, and those skilled in the art will understand that it should be as "one or more" unless the context clearly dictates otherwise.

The names of messages or information interacted between devices in embodiments of the present disclosure are for illustrative purposes only.

FIG. 1 is a schematic flowchart of a method for display controlling provided by an embodiment of the present disclosure. The method may be performed by an apparatus for display controlling, wherein the apparatus may be implemented by software and/or hardware, and configurable in an electronic device, for example, a cell phone or tablet. The method for display controlling provided by the embodiment of the present disclosure is suitable for media contents being viewed. As shown in FIG. 1, the method for display controlling provided by the embodiment may include:

S101, displaying a target media content and a first control corresponding to the target media content on a media content display page, wherein the first control is configured to indicate a display progress of the target media content.

The target media content may be a media content currently displayed in the media content display page, and the media content may be, for example, a media content composed of a plurality of independent pictures arranged in a certain order; or it may be a video content, i.e. a media content composed of consecutive video frames, among others.

The first control may be used to indicate a display progress of the currently displayed target media content and may further be used to adjust the display progress of the target media content. The first control may include at least one element, and the at least one element may be arranged according to the order of the corresponding pictures in the target media content. At this time, the display progress of the target media content may be indicated by the at least one element. Optionally, the at least one element is at least one thumbnail corresponding to the target media content. In an exemplary embodiment, when the target media content is the media content composed of the plurality of independent pictures, the element may be a thumbnail of each picture contained in the target media content; when the target media content is the video content, the element may be a thumbnail of a video frame in the target media content, such as a thumbnail of a key video frame contained in the target media content. The individual elements may be arranged in a transverse direction, a longitudinal direction or in other arrangements, and the transverse arrangement of the individual elements is described as an example below.

In one embodiment, the target media content and the first control corresponding to the target media content may be displayed on the media content display page, and at least one element of the first control may be displayed, as shown in FIG. 2. If at least one thumbnail included in the first control is displayed, the element corresponding to the currently displayed picture (such as element 3 shown in FIG. 2) may have a different display style from other elements located behind the element in the first control, so as to facilitate the user to determine the element corresponding to the currently displayed picture and the display progress of the target media content.

In the embodiment, the first control corresponding to the target media content may be displayed when the target media content is displayed or when the target media content is displayed to a set node, i.e., the first control corresponding to the target media content is automatically displayed.

In the embodiment, the first control corresponding to the target media content may also be displayed based on a respective triggering operation of a user, i.e., when a triggering operation for displaying the first control corresponding to the target media content is received, the first control corresponding to the target media content is displayed, for example, the first control corresponding to the target media content is added to the media content display page; or other control (such as a second control) displayed in the media content display page is switched to display the first control corresponding to the target media content, and at this time, the displaying the target media content and the first control corresponding to the target media content on the media content display page may include: displaying the target media content and a second control corresponding to the target media content in the media content display page; switching, in response to a triggering operation for the second control, the second control to the first control.

The second control may be a control displayed in the media content display page that is different from the first control, among others. In an exemplary embodiment, the second control may be a control related to the display progress of the target media content, such as a control for indicating the display progress of the target media content. The second control may have a different display style and/or functionality than the first control, e.g. the second control may be used only to indicate the display progress of the target media content and not to adjust the display progress of the target media content. The second control may be displayed in its entirety within the media content display page. In an exemplary embodiment, when the target media content is the media content composed of the plurality of independent pictures, the second control may contain multiple segments of progress bars that correspond to the pictures in the target media content by one to one, as shown in FIG. 3; when the target media content is the video content, the second control may contain only one progress bar corresponding to the target media content, as shown in FIG. 4.

The triggering operation for the second control may be a triggering operation for switching the display from the second control to the first control, such as a long-pressing operation or a sliding operation acting in an associated area for the second control.

In an exemplary embodiment, when the target media content is displayed in the media content display page, the second control for the target media content may be displayed in the media content display page, as shown in FIGS. 3 and 4. Thus, the user may perform a triggering operation for the first control when attempting to view an element in the second control or interact based on the first control. Accordingly, when the triggering operation for the second control is received, the electronic device may switch the display from the second control to the first control, as shown in FIG. 2, and may display the element in the first control according to a corresponding display progress at a triggering position of the triggering operation, i.e., display an element whose the corresponding display progress in the second control matches the display progress corresponding to the triggering position in the first control at the triggering position of the triggering operation, and in other words, the triggering position corresponds to the same display progress in the first control and the second control.

S102, in response to a sliding operation acting within the media content display page, adjusting at least one of a position of at least one element in the first control or a display size of an object to be adjusted, the object to be adjusted including at least one of: at least one element of the first control, or a target image of the target media content that is currently displayed within the media content display page, wherein the first control includes at least one element.

The sliding operation acting within the media content display page may be a sliding operation for indicating to adjust the position and/or display size of the at least one element in the first control, and/or a sliding operation for indicating to adjust the display size of the target image displayed in the media content display page, such as an operation for sliding in a set direction, among others. In an exemplary embodiment, the sliding operation may include a lateral sliding operation and/or a vertical sliding operation that starts within an associated area for the first control. Alternatively, the sliding operation may be a single-finger sliding operation or a multi-finger sliding operation with the same sliding direction for each finger so as to reduce the difficulty of operation when controlling the target media content. The object to be adjusted may include at least one element in the first control and/or a target image displayed within a target media content display page. The target image may be an image of the target media content that is currently displayed in the media content display page, which may include some or all of the images currently displayed in the media content display page.

In an exemplary embodiment, when the sliding operation that acts within the media content display page is received, the position of the at least one element in the first control may be adjusted, and for example, a moving position/moving speed of the at least one element in the first control is adjusted according to a sliding distance/sliding speed of the sliding operation; and/or the display size of the object to be adjusted is adjusted, and for example, the scaling ratio of the object to be adjusted is determined according to the sliding distance of the sliding operation or the distance between the current position of the sliding operation and a certain position (such as a sliding starting point) on the sliding track thereof, and the object to be adjusted is scaled according to the scaling ratio, etc. It is to be understood that the sliding distance may be a projection distance of the sliding operation in a specified direction of the interface, for example, a horizontal direction or a vertical direction.

In the embodiment, the second control may remain displayed after the sliding operation has been triggered. Also, the display of the first control may be stopped when a set condition is satisfied, and for example, the display of the first control may be stopped when the above-mentioned sliding operation has been triggered, or the display of the first control may be stopped when the duration from the end of the last trigger of the above-mentioned sliding operation reaches a preset duration. At this time, the method for display controlling provided by the embodiment may further include: in response to a trigger of the sliding operation ending, stopping displaying the first control; or in response to a duration from an end of a last trigger of the sliding operation reaching a preset duration, stopping displaying the first control. The sliding operation may include a contacting event, a sliding event and a lifting event, so the triggering end of the sliding operation may be the receipt of the lifting event of the sliding operation, and the last triggering end of the sliding operation may be the last receipt of the lifting event of the above-mentioned sliding operation, among others.

In the embodiment, the display of the first control may be stopped by directly cancelling the display of the first control (i.e., not switching the display from the first control to another control); or the display of the first control may be stopped by switching the display from the first control to another control (such as the second control), and at this time, optionally, the stopping displaying the first control includes: switching the first control to the second control.

The method for display controlling provided by the embodiment displays a target media content and a first control corresponding to the target media content on a media content display page, wherein the first control is configured to indicate a display progress of the target media content; adjusts, in response to a sliding operation acting within the media content display page, at least one of a position of at least one element in the first control or a display size of an object to be adjusted, the object to be adjusted including at least one of: at least one element of the first control, or a target image of the target media content currently displayed within the media content display page, wherein the first control includes at least one element. With the above-mentioned technical solution, the embodiment enables the user to adjust at least one of the display position of the element in the first control or the display size of the object through a simple sliding operation, thereby enriching the control mode of the media content and reducing the control difficulty of the media content.

FIG. 5 is a schematic flowchart of another method for display controlling provided by an embodiment of the present disclosure. The solution of the embodiment may be combined with one or more of the alternatives of the embodiments described above. Optionally, the adjusting, in response to the sliding operation acting within the media content display page, at least one of a position of at least one element in the first control or a display size of an object to be adjusted includes: moving, in response to a first sliding operation for the first control, the at least one element in a first direction.

In one embodiment, the method for display controlling provided by the embodiment further comprises: displaying a target picture in the target media content that corresponds to a target element in the media content display page, wherein the target element is an element displayed at a current position to which the first sliding operation slides.

Optionally, the adjusting at least one of the position of at least one element in the first control and the display size of the object to be adjusted includes: moving, in response to the sliding operation sliding to a target boundary position of an associated area corresponding to the first control, a first element or a last element of the first control into the media content display page for display.

Accordingly, as shown in FIG. 5, the method for display controlling provided by the embodiment may include:

S201, displaying a target media content and a first control corresponding to the target media content on a media content display page, wherein the first control is configured to indicate a display progress of the target media content.

S202, moving, in response to a first sliding operation for the first control, at least one element of the first control in a first direction, wherein the first control includes at least one element.

The first sliding operation may be an operation for sliding along a preset direction, such as an operation for sliding along a direction parallel to the arrangement of individual elements in the first control, etc. Alternatively, the first sliding operation may be a lateral sliding operation when the elements are arranged laterally. The first sliding operation may act within an associated area for the first control. An associated area for a control, such as the first control or the second control, may be a response area of the control, which may include a display area of the control.

In the embodiment, the user may control the at least one element of the first control through the first sliding operation so as to view an element of the first control that is not displayed within the media content display page and/or adjust the display progress of the target media content.

Optionally, when the first sliding operation for the first control is received, the at least one element of the first control may be moved in a first direction, and for example, the individual element(s) of the first control is moved along its direction of arrangement so as to adjust the position of the individual element(s) and/or move the undisplayed element into the media content display page for display.

Here, the first direction may be understood as a direction of movement of the at least one element of the first control, which may be a preset direction related to the sliding direction of the first sliding operation. Optionally, the first direction is different from the sliding direction of the first sliding operation, and/or the moving speed of the at least one element is different from the sliding speed of the first sliding operation. That is, the moving direction of the element in the first control is not identical to the sliding direction of the first sliding operation, and the moving speed of the element in the first control is not identical to the sliding speed of the first sliding operation, thereby adjusting the displayed element at the current position to which the first sliding operation slides.

Optionally, the first direction is opposite to the sliding direction of the first sliding operation, and the moving speed of the at least one element is positively correlated with the sliding speed of the first sliding operation. At this time, the at least one element of the first control may be controlled to move in the same direction as the touch point of the first sliding operation at the moving speed positively correlated with the sliding speed of the first sliding operation. Taking the lateral arrangement of individual elements and the first sliding operation as an example, when the first sliding operation slides to the right, the individual elements in the first control may be controlled to move to the left; when the first sliding operation slides to the left, the individual elements in the first control may be controlled to move to the right. Thus, only a small sliding distance is required for the user to contact an element at a longer distance, and it is unnecessary to slide the distance between the trigger position of the user and the display position of the element before sliding, which can shorten the distance that the user needs to slide when viewing different elements or adjusting the display progress of the target media content, and reduce the difficulty of the display control of the media content.

In the embodiment, regardless of whether all the elements contained in the first control are displayed within the media content display page, when the first sliding operation is received, the at least one element in the first control is controlled to move in the first direction; or considering whether all the elements contained in the first control are displayed within the media content display page, the at least one element in the first control is controlled to move along the first direction only when all the elements contained in the first control are not displayed within the media content display page, and the element(s) in the first control is not controlled to move along the first direction when all the elements contained in the first control are displayed within the media content display page, and at this time, the moving the at least one element along the first direction may include: moving, in response to not all of the at least one element being displayed within the media content display page, the moving of the at least one element along the first direction.

In one implementation, the moving the at least one element along the first direction includes: determining a target moving speed of the at least one element according to the sliding speed of the first sliding operation and an arrangement length of the at least one element, and moving the at least one element along the first direction at the target moving speed.

The arrangement length of at least one element may be the total arrangement length of the individual element(s) in the first control when it is displayed, which may be the sum of the total width of the individual element(s) and the total spacing distance among the individual element(s) (i.e., the sum of gap(s) between the adjoined individual elements), among others. The target moving speed may be a moving speed of at least one element in moving the at least one element in the first control.

In the above-described implementation, the sliding speed of the first sliding operation at the current moment may be determined in real time, the target moving speed of the element(s) in the first control is determined according to the sliding speed and the total arrangement length of the individual element(s) in the first control, and the individual element(s) in the first control is controlled to move according to the target moving speed.

In the embodiment, the target moving speed may be positively correlated with the sliding speed of the first sliding operation and with the difference between the total arrangement length of the individual element(s) in the first control and the arrangement length of the individual element (s) displayed in the media content display page. It is assumed that the projected moving speed of the first sliding operation in the extending direction of the arrangement of the elements of the first control is $v0$, the arrangement length of the element(s) of the first control that is displayed within the media content display page (i.e., the arrangement length of the individual element(s) displayed in the media content display page) is $L0$, the total arrangement length of the individual element(s) in the first control is $L1$, and the length of the associated area for the first control in the extending direction of the arrangement of the element(s) of the first control is $L2$, and optionally, the target moving speed $v1=(L1-L0) v0/L2$, and accordingly, when the first sliding operation slides to a side of the associated area corresponding to the first control, for example, an endpoint position of the associated area for the first control in the arrangement direction of individual elements, the first/last element in the first control can just move into the media content display page for display, thereby satisfying the display progress adjustment requirement of the user. Here, the values of L0 and L2 may be the same or different, and for example, L0=L2.

In an exemplary embodiment, as shown in FIG. 6, when the first n elements of the first control in the current interface are arranged horizontally (taking n=5 as an example in FIG. 6) and the first sliding operation is sliding horizontally from the left side of the associated area corresponding to the first control to the right side of the associated area (for example, when the elements of the first control are arranged to be equal to the width of the screen, from one side to the other side of the screen at the associated area), the element(s) in the first control may be moved from right to left such that the last n elements just move into the media content display page for display, as shown in FIG. 7 (taking m elements contained in the first control as an example in FIG. 7), thereby quickly satisfying the user's display progress adjustment requirements.

S203, displaying a target picture of the target media content that corresponds to a target element in the media content display page, wherein the target element is an element displayed at a current position to which the first sliding operation slides.

Here, the current position may be understood as a position to which the first sliding operation is currently sliding. The target element may be an element displayed at the current location. The target picture may be a picture of the target media content that corresponds to the target element, which may be a separate picture or a video frame.

In the embodiment, when the first sliding operation is received, the display progress of the target media content may further be adjusted based on the first sliding operation, and for example, a current position to which the first sliding operation slides may be determined in real time during the sliding of the first sliding operation, and the display progress of the target media content may be adjusted to a display progress corresponding to an element displayed at the current position so as to display the target picture corresponding to the element displayed at the current position in a target media content display page.

S204, moving, in response to the sliding operation sliding to the target boundary position of an associated area corresponding to the first control, the first or last element of the first control into the media content display page for display, wherein the sliding operation includes the first sliding operation.

In the embodiment, the individual element(s) of the first control may be controlled to move along the first direction according to the sliding speed of the received sliding operation (such as the first sliding operation) and the total arrangement length of the individual element(s) of the first control, so the first or last element of the first control is controlled to move into the media content display page for display when the sliding operation slides to the target boundary position of the associated area corresponding to the first control.

Here, the target boundary position may be a boundary position corresponding to the sliding direction of the first sliding operation, and for example, when the first sliding operation is a lateral sliding operation, the target boundary position may include a left boundary position of the associated area corresponding to the first control and/or a right boundary position of the associated area corresponding to the first control.

Taking the horizontal arrangement of the individual element(s) in the first control and the first sliding operation being the horizontal sliding operation as an example, when it is detected that the user slides to the left within the associated area for the first control (for example, within the display area of the first control), the individual element(s) of the first control may be controlled to move to the right, and the first element in the first control is controlled to move into the media content display page for display when the user slides to the left boundary position of the associated area for the first control; when it is detected that the user slides to the right within the associated area for the first control, the individual element(s) of the first control may be controlled to move to the left, and the last element of the first control may be controlled to move into the media content display page for display when the user slides to the right boundary position of the associated area for the first control.

At this time, since when sliding to the left/right boundary of the associated area for the first control, the first/last element of the first control is exactly located at the left/right boundary, i.e., what is displayed at the current position to which the sliding operation slides at this time is the first/last element in the first control, the display progress of the target media content can also be adjusted, and the picture of the target media content that corresponds to the one element/the last element is displayed in the media content display page.

The method for display controlling provided by the embodiment controls, in response to receiving the first sliding operation for the first control, at least one element of the first control to move along the first direction, displays the target picture corresponding to the displayed target element at the current position to which the first sliding operation slides in the media content display page, and controls, when the first sliding operation slides to the target boundary position of the associated area corresponding to the first control, the first or last element of the first control to move into the media content display page for display. By adopting the above-mentioned technical solution, the embodiment can shorten the sliding distance required for completely viewing the element(s) of the first control and/or adjusting the display progress of the target media content on the premise that the element(s) of the first control is clearly shown, thereby reducing the user's operational difficulty when viewing the element(s) of the first control and/or adjusting the display progress of the target media content, and improving the viewing efficiency.

FIG. 8 is a schematic flowchart of another method for display controlling provided by an embodiment of the present disclosure. The solution of the embodiment may be combined with one or more of the alternatives of the embodiments described above. Optionally, adjusting, in response to the sliding operation acting within the media content display page, the position of the at least one element in the first control and/or the display size of the object to be adjusted includes: in response to a second sliding operation for the first control, scaling the object to be adjusted.

Optionally, after the scaling the object to be adjusted, further comprising: in response to a destination of the second sliding operation being located in an associated area corresponding to the first control, detecting in real time and responding to a target triggering operation for the first control, wherein the target triggering operation starts from the destination, and the target triggering operation includes an operation for controlling the target media content to perform display progress adjustment;

Optionally, the method for display controlling provided in the embodiment further comprises: display, in response to the second sliding operation sliding to any one of the elements, a picture of the target media content that corresponds to the any one of the elements in the media content display page.

Accordingly, as shown in FIG. 8, the method for display controlling provided by the embodiment may include:

S301, displaying a target media content and a first control corresponding to the target media content on a media content display page, wherein the first control is configured to indicate a display progress of the target media content.

S302, scaling, in response to the second sliding operation for the first control, the object to be adjusted, the object to be adjusted including at least one of the following: at least one element of the first control, a target image of the target media content that is currently displayed within the media content display page, wherein the first control includes at least one element.

The second sliding operation may be a different sliding operation than the first sliding operation, such as a sliding operation for a different area and having a different sliding trajectory and/or sliding direction than the first sliding operation. In an exemplary embodiment, the first sliding operation may be a sliding operation in which the sliding direction is parallel to the arrangement direction of the individual elements, and the second sliding operation may be a sliding operation in which the sliding direction is perpendicular to the arrangement direction of the individual elements. For example, when the individual elements are arranged laterally, the first sliding operation may be a lateral sliding operation and the second sliding operation may be a longitudinal sliding operation. The second sliding operation may be a single-finger sliding operation that starts within the associated area for the first control or a multi-finger sliding operation that starts within the associated area for the first control and has the same sliding direction for each gesture.

In the embodiment, the user may scale the at least one element of the first control and/or the image(s) of the currently displayed target media content in the media content display page by a second sliding operation to view the element(s) of the first control and/or the currently displayed image(s) at a different scaling ratio.

Alternatively, in response to receiving the second sliding operation for the first control, the object to be adjusted may be scaled according to a distance the second sliding operation slides in a preset sliding direction.

In an example, taking the second sliding operation as a vertical sliding operation and the object to be adjusted as a target image, when it is detected that the user slides vertically in the media content display page, a distance between the current position to which the user slides and a sliding starting point of this vertical sliding can be detected in real time, a scaling ratio of the target image is determined according to the distance, and the target image displayed in the media content display page is scaled according to the scaling ratio.

In one implementation, scaling, in response to the second sliding operation for the first control, the object to be adjusted includes: in response to the second sliding operation in a second direction, enlarging the object to be adjusted; and/or in response to the second sliding operation in a third direction, reducing the object to be adjusted.

Here, the second direction may be a sliding direction for indicating that the object to be adjusted is enlarged; the third direction may be a sliding direction for indicating that the object to be adjusted is reduced. For example, the second and third directions are opposite sliding directions, for example, the second direction may be upward, and the third direction may be downward; alternatively, the second direction may be downward, the third direction may be upward, etc. In the following description, the second direction is an upward direction and the third direction is a downward direction.

In the above-described embodiment, it may be determined whether the object to be adjusted is enlarged or reduced according to the sliding direction of the second sliding operation. For example, when the upward sliding of the user is detected, the object to be adjusted may be enlarged according to the distance of the upward sliding of the user; when the downward sliding of the user is detected, the object to be adjusted may be reduced according to the distance of the downward sliding of the user.

In one embodiment, scaling, in response to the second sliding operation for the first control, the object to be adjusted includes: in a process for controlling the target media content to perform display progress adjustment, enlarging, in response to the second sliding operation for switching to the second direction at a target element in the first control, the object to be adjusted corresponding to the target element; and/or, reducing, in response to the second sliding operation in the second direction being switched to the second sliding operation in a third direction, the object to be adjusted corresponding to the target element.

Here, the target element may be an element corresponding to the currently displayed picture in the media content display page. The object to be adjusted corresponding to the target element may include the target element itself, and/or the target image displayed in the picture.

In the above-mentioned solution, the user can implement a scaling operation on the object to be adjusted through a second sliding operation in the process that the progress adjustment has been performed, i.e., the user may perform the second sliding operation by switching the sliding direction when the operation for controlling the display progress adjustment of the target media content is performed, and may instruct the electronic device to select an enlarging process or a reducing process on the object to be adjusted corresponding to the target element by switching the sliding direction during the execution of the second sliding operation. Alternatively, when the scaling operation is finished, the user may switch the sliding direction again to continue the progress adjusting operation.

In an exemplary embodiment, in the process for controlling the display progress adjustment of the target media content, the user keeps the finger(s) in contact, instructs the electronic device to enlarging the object to be adjusted corresponding to the target element by switching the sliding direction to the second direction, and may keep the finger(s) contact while sliding along the second direction, and instructs the electronic device to reduce the object to be adjusted corresponding to the target element by switching the sliding direction from the second direction to the third direction.

Accordingly, when it is detected that the sliding direction of the user is switched to the second direction, the electronic device may stop adjusting the display progress of the target media content, determine a target element displayed at the current position to which the user slides when the sliding direction is switched, and perform a enlarging process on the object to be adjusted corresponding to the target element; when it is detected that the sliding direction of the user is switched from the second direction to the third direction, the electronic device may perform a reducing process on the object to be adjusted corresponding to the target element.

In an exemplary embodiment, the above-mentioned second direction is a vertical upward direction, and the third direction is a vertical downward direction; in a process for the user to adjust the progress through a sliding operation in a horizontal direction, by switching the sliding direction to the vertical upward direction, when the finger(s) performs the direction switching, the corresponding object to be adjusted may be enlarged; and in a process for the upward sliding operation, the user slides again vertically downward back to the progress adjusting area, and then the enlarged picture may be reduced again, and the original size may be restored after the finger(s) reaches the progress adjusting area; and at the same time, the user may now keep the finger(s) in contact with the screen and switch to the horizontal sliding to continue adjusting the progress.

It is to be understood that the enlarging/reducing process to be performed on the object to be adjusted mentioned in the embodiment may be an enlarging/reducing process to be performed on the object to be adjusted with respect to the initial size of the object to be adjusted when the user slides along the direction for indicating the enlarging/reducing process to be performed on the adjusted object, that is, if the user slides to a certain position along the second direction and switches from sliding along the second direction to sliding along the third direction, the size of the object to be adjusted after enlarged along the second direction may be taken as the initial size, and the object to be adjusted may be reduced.

In the embodiment, scaling the object to be adjusted may include, for example, scaling a target image of the target media content that is currently displayed within the media content display page, and for example, the target image is scaled with a preset position or a display position of the target image in the target picture as a center. At this time, optionally, the scaling the object to be adjusted includes: scaling, with a target position as a center, a target image of the target media content that is currently displayed within the media content display page, wherein the target position is a preset position of a target picture where the target image is located or a display position of the target image.

In the embodiment, the target position may be set in advance as a preset position or a display position of the target image as needed; or may be determined according to the number of images of a target object contained in the target picture, and at this time, before scaling the object to be adjusted, the method further comprises: performing image recognition on the target picture, and determining a total number of candidate images contained in the target picture, wherein the candidate images include images of a target object; and performing at least one of: taking, in response to determining that the total number is zero, the preset position in the target picture as the target position; taking, in response to determining that the total number is one, a display position of the candidate image in the target picture as the target position; taking, in response to determining that the total number is greater than or equal to two, a display position of a target image among the candidate images in the target picture as the target position.

Here, the target object may be an object to be identified, such as a person object, an animal object and/or a physical object, etc. It should be noted that the embodiment only identifies whether the target image is included in the target picture as well as the number of the included target image(s), but does not identify the specific identity information of the person, animal or object corresponding to the confirmed target image.

In an exemplary embodiment, the image recognition may be performed on the target picture, the total number of image(s) of the target object contained in the target picture is determined, and if the total number is zero, i.e., if the target picture does not contain an image of the target object, a preset position in the target picture may be taken as the target position; if the total number is 1, i.e., if the target picture contains only one image of the target object, this image of the target object may be taken as the target image, and a display position of the target image in the target picture may be taken as the target position; if the total number is greater than or equal to 2, i.e., if the target picture contains a plurality of images of the target object, the display position of a certain image among the plurality of images of the target object in the target picture may be taken as the target position, and for example, a certain image of the target object in the target picture (such as an image of the target object near the central position of the target picture and/or an image of a person, etc.) may be taken as the target image, and the display position of the target image in the target picture may be taken as the target position.

In the embodiment, when the target image is scaled, only the target image displayed in the target picture may be scaled, and the target picture or the non-target image displayed in the target picture may not be scaled; or it is possible to scale the target picture directly.

S303, displaying, in response to the second sliding operation sliding to any one of the element(s), a picture of the target media content that corresponds to the any one of the element(s) in the media content display page.

In the embodiment, when the second sliding operation slides to the display position of a certain element in the first control, the target media content may be displayed according to the display progress corresponding to the element. In other words, a picture of the target media content that corresponds to the element object is displayed in the media content display page.

In an exemplary embodiment, when the second sliding operation slides to a display position of a certain element in the first control, if the element is an element corresponding to a picture currently displayed in the media content display page, the picture corresponding to the element may continue to be displayed in the media content display page; if the element is not the element corresponding to the picture currently displayed in the media content display page, the display progress of the target media content may be adjusted, and the picture corresponding to the element is displayed in the media content display page.

S304, in response to a destination of the second sliding operation being located in an associated area corresponding to the first control, detecting in real time and responding to a target triggering operation for the first control, wherein the target triggering operation starts from the destination, and the target triggering operation includes an operation for controlling the target media content to perform display progress adjustment.

Here, the target triggering operation may be a triggering operation for the first control that starts from the destination of the second sliding operation. The triggering operation that starts from the destination of the second sliding operation may be a triggering operation which is triggered continuously with no interruption along with the second sliding operation, such as a triggering operation which is continuously performed starting from the destination of the second sliding operation without lifting the finger(s) after the user slides to the destination of the second sliding operation.

In an exemplary embodiment, the target triggering operation may include an operation for controlling the target media content to perform the display progress adjustment. The operation for controlling the target media content to perform the display progress adjustment may be understood as an operation for adjusting the display progress of the target media content, such as the first sliding operation.

When the target triggering operation is an operation for controlling the target media content to perform the display progress adjustment, optionally, a continuous sliding is maintained while switching between the second sliding operation and the operation for controlling the target media content to perform the display progress adjustment. For example, after sliding to the destination of the second sliding operation, the user may continue to perform the target triggering operation by switching the sliding direction without lifting the finger(s).

Taking the example that the elements in the first control are arranged horizontally, the first sliding operation is a horizontal sliding operation, and the second sliding operation is a vertical sliding operation, when the target media content is initially displayed, a second control corresponding to the target media content may be displayed in the media content display page.

Accordingly, by performing a triggering operation for the second control, the user may instruct the electronic device to switch the display from the second control to the first control, and the user may continue to perform the horizontal sliding without lifting the finger(s) after the triggering operation is performed so as to instruct an application program to control the element in the first control to move and display, in the media content display page, a target picture corresponding to a target element displayed at the current position to which it slides; and after switching to the target picture to be viewed, still without lifting the finger(s), the user may slides vertically starting from the current position so as to instruct the electronic device to scale the target picture.

By performing a triggering operation for the second control, the user may further instruct the electronic device to switch the display from the second control to the first control, and the user may continue to perform the vertical sliding without lifting the finger(s) after the triggering operation is performed so as to instruct the electronic device to scale the currently displayed picture; and after scaling and viewing the currently displayed picture, the user may slide back into the associated area for the first control, still without lifting the finger(s), in order to slide horizontally starting from the current position after sliding back into the associated area for the first control so as to instruct the electronic device to control the element in the first control to move and display a target picture corresponding to a target element displayed at the current position to which it slides in the media content display page.

It should be understood that the first and second sliding operations may be performed repeatedly for multiple times, for example, after performing the second sliding operation/ the first sliding operation, the user may still maintain the contact state of the finger(s) and continue to change the sliding direction and perform the first sliding operation/the second sliding operation so as to switch the display progress of the target media content again or scale the currently displayed picture.

The method for display controlling provided in the embodiment can scale the object to be adjusted and/or adjust the display progress of the media content based on the continuous sliding of the user, can simplify the operations required when performing display control on the media content, reducing the difficulty of control on the media content, especially reducing the difficulty of single-hand control on the media content during the progress adjustment, and improving the user's experience.

FIG. 9 is a block diagram of an apparatus for display controlling according to an embodiment of the present disclosure. The apparatus may be implemented by software and/or hardware, may be configured in an electronic device, for example, a mobile phone or a tablet computer, and may perform display control on a media content by performing a method for display controlling. As shown in FIG. 9, the apparatus for display controlling provided in the embodiment may include: a control display module 701 and an adjustment module 702, wherein A control display module 701 is configured to display a target media content and a first control corresponding to the target media content on a media content display page, wherein the first control is configured to indicate a display progress of the target media content;

An adjustment module 702 is configured to adjust, in response to a sliding operation acting within the media content display page, at least one of a position of at least one element in the first control or a display size of an object to be adjusted, the object to be adjusted including at least one of: at least one element of the first control, or a target image of the target media content that is currently displayed within the media content display page, wherein the first control includes at least one element.

The apparatus for display controlling provided in the embodiment: displays, by the control display module, a target media content and a first control corresponding to the target media content on a media content display page, wherein the first control is configured to indicate a display progress of the target media content; adjusts, by the adjustment module in response to a sliding operation acting within the media content display page, at least one of a position of at least one element in the first control or a display size of an object to be adjusted, the object to be adjusted including at least one of: at least one element of the first control, or a target image of the target media content that is currently displayed within the media content display page, wherein the first control includes at least one element. With the above-mentioned technical solution, the embodiment enables the user to adjust the display position of the element in the first control and/or the display size of the object through a simple sliding operation, thereby enriching the control mode of the media content and reducing the control difficulty of the media content.

In the above-mentioned solution, the at least one element is at least one thumbnail corresponding to the target media content.

In the above-mentioned solution, the adjustment module 702 may include: a first movement controlling unit set to move, in response to a first sliding operation for the first control, the at least one element along a first direction.

In the above-mentioned solution, the movement controlling unit may be further set to: display a target picture of the target media content that corresponds to a target element in the media content display page, wherein the target element is an element displayed at a current position to which the first sliding operation slides.

In the above-mentioned solution, the movement controlling unit may be set to control the at least one element along the first direction by: moving, in response to not all of the at least one element being displayed within the media content display page, the at least one element along the first direction.

In the above-mentioned solution, the first direction is different from a sliding direction of the first sliding operation, and/or a moving speed of the at least one element is different from a sliding speed of the first sliding operation.

In the above-mentioned solution, the first direction is opposite to the sliding direction of the first sliding operation, and a moving speed of the at least one element is positively correlated with a sliding speed of the first sliding operation.

In the above-mentioned solution, the movement controlling unit may be set to move the at least one element along the first direction by: determining a target moving speed of the at least one element according to the sliding speed of the first sliding operation and an arrangement length of the at least one element, and moving the at least one element along the first direction at the target moving speed.

In the above-mentioned solution, the adjustment module 702 may include: a second movement controlling unit set to move, in response to the sliding operation sliding to a target boundary position of an associated area corresponding to the first control, a first element or a last element of the first control into the media content display page for display.

In the above-mentioned solution, the adjustment module 702 may include: a scaling unit set to scale, in response to a second sliding operation for the first control, the object to be adjusted.

In the above-mentioned solution, the scaling unit may be set to scale, in response to the second sliding operation for the first control, the object to be adjusted by: enlarging, in response to the second sliding operation along a second direction, the object to be adjusted; and/or reducing, in response to the second sliding operation along a third direction, the object to be adjusted.

In the above-mentioned solution, the scaling unit may be set to scale, in response to the second sliding operation for the first control, the object to be adjusted by: in a process for controlling the target media content to perform display progress adjustment, enlarging, in response to the second sliding operation for switching to the second direction at a target element of the first control, the object to be adjusted corresponding to the target element; and/or, reducing, in response to the second sliding operation in the second direction being switched to the second sliding operation in a third direction, the object to be adjusted corresponding to the target element.

Optionally, the adjustment module 702 may further include: an operation detecting unit set to after scaling the object to be adjusted, in response to a destination of the second sliding operation being located in an associated area corresponding to the first control, detect in real time and respond to a target triggering operation for the first control, wherein the target triggering operation starts from the destination, and the target triggering operation includes an operation for controlling the target media content to perform display progress adjustment.

In the above-mentioned solution, a continuous sliding is maintained while switching between the second sliding operation and the operation for controlling the target media content to perform the display progress adjustment.

In the above-mentioned solution, the scaling unit may be set to scale the object to be adjusted by: scaling, with a target position as a center, a target image of the target media content that is currently displayed within the media content display page, wherein the target position is a preset position of a target picture where the target image is located or a display position of the target image.

Optionally, the adjustment module 702 may further include: a position determining unit set to before scaling the object to be adjusted, perform image recognition on the target picture, and determine a total number of a candidate image contained in the target picture, wherein the candidate image include an image of a target object; and perform at least one of: taking, in response to determining that the total number is zero, the preset position in the target picture as the target position; taking, in response to determining that the total number is one, a display position of the candidate image in the target picture as the target position; taking, in response to determining that the total number is greater than or equal to two, a display position of a target image among the candidate image in the target picture as the target position.

Optionally, the scaling unit may be further set to: display, in response to the second sliding operation sliding to any one of the element, a picture of the target media content that corresponds to the any one of the element in the media content display page.

Optionally, the apparatus for display controlling provided in the embodiment may further include: a display stopping module set to stop, in response to an end of a trigger of the sliding operation, displaying the first control; or stop, in response to a duration from an end of a last trigger of the sliding operation reaching a preset duration, displaying the first control.

In the above-mentioned solution, the display stopping module may be set to stop displaying the first control by: switching the first control to a second control.

In the above-mentioned solution, the control display module 701 may include: a display unit set to display the target media content and a second control corresponding to the target media content in the media content display page; a switching unit set to switch, in response to a triggering operation for the second control, the second control to the first control.

An apparatus for display controlling according to an embodiment of the present disclosure can perform a method for display controlling according to any embodiment of the present disclosure, and has functional modules and advantageous effects corresponding to the performing on the method for display controlling. Details not described in detail in this embodiment can be found in the method for display controlling provided in any embodiment of the present disclosure.

Reference is now made to FIG. 10, which illustrates a block schematic diagram of an electronic device (e.g. a terminal device) 800 suitable for implementing an embodiment of the present disclosure. The terminal device in the disclosed embodiment may include a mobile terminal such as a mobile phone, a notebook computer, a digital broadcast receiver, a personal digital assistant (PDA), a portable android device (PAD), a portable media player (PMP), an in-vehicle terminal (e.g. an in-vehicle navigation terminal), etc. and a fixed terminal such as a television (TV), a desktop computer, etc. The electronic device shown in FIG. 10 is merely an example.

As shown in FIG. 10, the electronic device 800 may include a processing device (e.g. central processing unit, graphics processor, etc.) 801 that may perform various suitable actions and processes in accordance with programs stored in a read-only memory (ROM) 802 or loaded from a storage 808 into a random access memory (RAM) 803. In the RAM 803, various programs and data required for the operation(s) of the electronic device 800 are also stored. The processing device 801, the ROM 802 and the RAM 803 are connected to each other via a bus 804. An input/output (I/O) interface 805 is also coupled to the bus 804.

In general, the following devices may be connected to the I/O interface 805: an input device 806 including, for example, a touch screen, a touch pad, a keyboard, a mouse, a camera, a microphone, an accelerometer, a gyroscope, etc.;

an output device 807 including, for example, a liquid crystal display (LCD), a speaker, a vibrator, etc.; a storage 808 including, for example, a magnetic tape, a hard disk, etc.; and a communication device 809. The communication device 809 may allow the electronic device 800 to communicate wirelessly or wired with other devices to exchange data. While FIG. 10 illustrates an electronic device 800 having various devices, it is to be understood that not all illustrated devices are required to be implemented or provided. More or fewer devices may alternatively be implemented or provided.

In particular, the processes described above with reference to flowcharts may be implemented as computer software programs in accordance with embodiments of the present disclosure. For example, embodiments of the present disclosure include a computer program product comprising a computer program embodied on a non-transitory computer-readable medium, the computer program comprising program code for performing the method illustrated by the flowchart. In such embodiments, the computer program may be downloaded and installed from a network via the communication device 809, or be installed from the storage 808, or be installed from the ROM 802. The computer program, when executed by the processing device 801, performs the functions described above in a method of an embodiment of the present disclosure.

Note that the computer-readable medium described above in the disclosure can be either a computer-readable signal medium or a computer-readable storage medium or any combination thereof. The computer-readable storage medium may be an electronic, magnetic, optical, electromagnetic, infrared, or semiconductor system, apparatus, or device, or any combination thereof. The computer readable storage medium may include an electrical connection having one or more wire, a portable computer diskette, a hard disk, a random access memory (RAM), a programmable memory (ROM), an erasable read-only memory (EPROM or a flash memory), an optical fiber, a compact disc read-only memory (CD-ROM), an optical storage device, a magnetic storage device, or any suitable combination thereof. In the disclosure, the computer-readable storage medium may be any tangible medium that contains or stores a program that can be used by or in connection with an instruction execution system, apparatus, or device. However, in the disclosure, the computer-readable signal medium may include a data signal propagated in baseband or as part of a carrier wave, on which computer-readable program code is embodied. Such propagated data signal may take many forms, which include an electromagnetic signal, an optical signal, or any suitable combination thereof. The computer-readable signal medium may also be any computer-readable storage medium other than the computer-readable storage that can send, propagate, or transfer the program for use by or in connection with the instruction execution system, apparatus, or device. The program code embodied on the computer-readable medium may be transmitted over any suitable medium including: wire, optic cable, radio frequency (RF), and the like, or any suitable combination thereof.

In some implementations, clients, servers may communicate using any currently known or future developed network protocol, such as HTTP (Hyper Text Transfer Protocol), and may be interconnected with any form or medium of digital data communication (e.g. a communication network). Examples of the communication network include a local area network (LAN), a wide area network (WAN), an internetwork (e.g. the Internet), a peer-to-peer network (e.g. an ad hoc peer-to-peer network), and any currently known or future developed network.

The computer-readable medium may be contained in the electronic device; it may also be present separately and not fitted into the electronic device.

The computer-readable medium carries one or more programs that, when executed by the electronic device, cause the electronic device to: display a target media content and a first control corresponding to the target media content on a media content display page, wherein the first control is configured to indicate a display progress of the target media content; adjust, in response to a sliding operation acting within the media content display page, at least one of a position of at least one element in the first control or a display size of an object to be adjusted, the object to be adjusted including at least one of: at least one element of the first control, or a target image of the target media content that is currently displayed within the media content display page, wherein the first control includes at least one element.

Computer program code for carrying out operations of the present disclosure may be written in one or more programming language including an object oriented programming language such as Java, Smalltalk, C++, and conventional procedural programming languages, such as the "C" language or similar programming languages, or a combination thereof. The program code may be executed entirely on the user's computer, partly on the user's computer, as a standalone software package, partly on the user's computer and partly on a remote computer or entirely on the remote computer or server. In the scenario involving the remote computer, the remote computer may be connected to the user's computer through any type of network, including a local area network (LAN) or a wide area network (WAN), or the connection may be made to an external computer (e.g. through the Internet using an Internet Service Provider).

The flowchart and block diagram in the Figures illustrate the architecture, functionality, and operation of possible implementations of systems, methods and computer program products according to various embodiments of the present disclosure. In this regard, each block in the flowchart or block diagram may represent a module, segment, or portion of code, which includes one or more executable instructions for implementing the specified logical function(s). It should also be noted that in some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagram and/or flowchart, and combinations of blocks in the block diagram and/or flowchart, can be implemented by special purpose hardware-based systems which perform the specified functions or operations, or combinations of special purpose hardware and computer instructions.

The units described in connection with the embodiments disclosed herein may be implemented in software or hardware. In this case, the name of a module can be set according to actual situations.

The functions described herein above may be performed, at least in part, by one or more hardware logic component(s). For example, an exemplary type of hardware logic component that may be used includes: a field programmable gate array (FPGA), an application specific integrated circuit (ASIC), an application specific standard product (ASSP), a system on a chip (SOC), a complex programmable logic device (CPLD), and the like, which is not limiting herein.

In the context of this disclosure, the machine-readable medium can be a tangible medium that can contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. The machine-readable storage medium may include an electrical connection based on one or more wire(s), a portable computer diskette, a hard disk, a random access memory (RAM), a read-only memory (ROM), an erasable programmable read-only memory (EPROM or a flash memory), an optical fiber, a compact disc read-only memory (CD-ROM), an optical storage device, a magnetic storage device, or any suitable combination thereof.

According to one or more embodiments of the present disclosure, example 1 provides a method for display controlling comprising:

displaying a target media content and a first control corresponding to the target media content on a media content display page, wherein the first control is configured to indicate a display progress of the target media content;

adjusting, in response to a sliding operation acting within the media content display page, at least one of a position of at least one element in the first control or a display size of an object to be adjusted, the object to be adjusted including at least one of: at least one element of the first control, or a target image of the target media content that is currently displayed within the media content display page, wherein the first control includes at least one element.

According to one or more embodiments of the present disclosure, example 2 is provided according to the method of example 1, wherein the at least one element is at least one thumbnail corresponding to the target media content.

According to one or more embodiments of the present disclosure, example 3 is provided according to the method of example 1, wherein the adjusting, in response to the sliding operation acting within the media content display page, at least one of a position of at least one element in the first control or a display size of an object to be adjusted includes:

moving, in response to a first sliding operation for the first control, the at least one element along a first direction.

According to one or more embodiments of the present disclosure, example 4 is provided according to the method of example 3, further comprising:

displaying a target picture of the target media content that corresponds to a target element in the media content display page, wherein the target element is an element displayed at a current position to which the first sliding operation slides.

According to one or more embodiments of the present disclosure, example 5 is provided according to the method of example 3, wherein the moving the at least one element along the first direction includes:

moving, in response to not all of the at least one element being displayed within the media content display page, the at least one element along the first direction.

According to one or more embodiments of the present disclosure, example 6 is provided according to the method of example 3, the first direction is different from a sliding direction of the first sliding operation, and/or a moving speed of the at least one element is different from a sliding speed of the first sliding operation.

According to one or more embodiments of the present disclosure, example 7 is provided according to the according to example 6, wherein the first direction is opposite to the sliding direction of the first sliding operation, and a moving speed of the at least one element is positively correlated with a sliding speed of the first sliding operation.

According to one or more embodiments of the present disclosure, example 8 is provided according to the method of example 7, wherein the moving the at least one element along the first direction includes:

determining a target moving speed of the at least one element according to the sliding speed of the first sliding operation and an arrangement length of the at least one element, and moving the at least one element along the first direction at the target moving speed.

According to one or more embodiments of the present disclosure, example 9 is provided according to the method of example 1, wherein the adjusting at least one of the position of at least one element in the first control and the display size of the object to be adjusted includes:

moving, in response to the sliding operation sliding to a target boundary position of an associated area corresponding to the first control, a first element or a last element of the first control into the media content display page for display.

According to one or more embodiments of the present disclosure, example 10 is provided according to the method of any of examples 1-9, wherein the adjusting, in response to the sliding operation acting within the media content display page, at least one of the position of the at least one element in the first control or the display size of the object to be adjusted includes:

scaling, in response to a second sliding operation for the first control, the object to be adjusted.

According to one or more embodiments of the present disclosure, example 11 is provided according to the method of example 10, wherein the scaling, in response to the second sliding operation for the first control, the object to be adjusted includes at least one of:

enlarging, in response to the second sliding operation along a second direction, the object to be adjusted;

reducing, in response to the second sliding operation along a third direction, the object to be adjusted.

According to one or more embodiments of the present disclosure, example 12 is provided according to the method of example 10, wherein the scaling, in response to the second sliding operation for the first control, the object to be adjusted includes at least one of:

in a process for controlling the target media content to perform display progress adjustment, enlarging, in response to the second sliding operation for switching to the second direction at a target element of the first control, the object to be adjusted corresponding to the target element;

reducing, in response to the second sliding operation in the second direction being switched to the second sliding operation in a third direction, the object to be adjusted corresponding to the target element.

According to one or more embodiments of the present disclosure, example 13 is provided according to the method of example 10, after scaling the object to be adjusted, the method further comprising:

in response to a destination of the second sliding operation being located in an associated area corresponding to the first control, detecting in real time and responding to a target triggering operation for the first control, wherein the target triggering operation starts from the destination, and the target triggering operation includes an operation for controlling the target media content to perform display progress adjustment.

According to one or more embodiments of the present disclosure, example 14 is provided according to the method of example 13, wherein a continuous sliding is maintained while switching between the second sliding operation and the operation for controlling the target media content to perform the display progress adjustment.

According to one or more embodiments of the present disclosure, example 15 is provided according to the method of example 10, wherein the scaling the object to be adjusted includes:

scaling, with a target position as a center, a target image of the target media content that is currently displayed within the media content display page, wherein the target position is a preset position of a target picture where the target image is located or a display position of the target image.

According to one or more embodiments of the present disclosure, example 16 is provided according to the method of example 15, before scaling the object to be adjusted, the method further comprising:

performing image recognition on the target picture, and determining a total number of a candidate image contained in the target picture, wherein the candidate image include an image of a target object; and performing at least one of:

taking, in response to determining that the total number is zero, the preset position in the target picture as the target position;

taking, in response to determining that the total number is one, a display position of the candidate image in the target picture as the target position;

taking, in response to determining that the total number is greater than or equal to two, a display position of a target image among the candidate image in the target picture as the target position.

According to one or more embodiments of the present disclosure, example 17 is provided according to the method of example 10, further comprising:

displaying, in response to the second sliding operation sliding to any one of the element, a picture of the target media content that corresponds to the any one of the element in the media content display page.

According to one or more embodiments of the disclosure, example 18 is provided according to the method of any one of examples 1-9, further comprising:

stopping, in response to an end of a trigger of the sliding operation, displaying the first control; or stopping, in response to a duration from an end of a last trigger of the sliding operation reaching a preset duration, displaying the first control.

According to one or more embodiments of the present disclosure, example 19 is provided according to the method of example 18, wherein the stopping displaying the first control includes:

switching the first control to a second control.

According to one or more embodiments of the present disclosure, example 20 is provided according to the method of any of examples 1-9, wherein the displaying a target media content and a first control corresponding to the target media content on a media content display page includes:

displaying the target media content and a second control corresponding to the target media content in the media content display page;

switching, in response to a triggering operation for the second control, the second control to the first control.

According to one or more embodiments of the present disclosure, example 21 provides an apparatus for display controlling comprising:

a control display module configured to display a target media content and a first control corresponding to the target media content on a media content display page, wherein the first control is configured to indicate a display progress of the target media content;

an adjustment module configured to adjust, in response to a sliding operation acting within the media content display page, at least one of a position of at least one element in the first control or a display size of an object to be adjusted, the object to be adjusted including at least one of: at least one element of the first control, or a target image of the target media content that is currently displayed within the media content display page, wherein the first control includes at least one element.

According to one or more embodiments of the present disclosure, example 22 provides an electronic device comprising:

at least one processor; and a memory communicatively coupled to the at least one processor; wherein, the memory stores a computer program executable by the at least one processor to enable the at least one processor to perform a method for display controlling according to any of examples 1 to 20.

According to one or more embodiments of the present disclosure, example 23 provides a computer-readable storage medium having stored thereon a computer program which, when executed by a processor, implements a method for display controlling as described in any of examples 1-20.

Further, while operations are depicted in a particular order, it should not be understood as requiring that the operations be performed in the particular order shown or in sequential order. In certain circumstances, multitasking and parallel processing may be advantageous. Certain features that are described in the context of separate embodiments may also be implemented in combination into a single embodiment. Conversely, various features that are described in the context of a single embodiment can also be implemented in multiple embodiments separately or in any suitable subcombination.

We claim:

1. A method for display controlling, comprising:

displaying a media content and a first control corresponding to the media content on a media content display page, wherein the first control is configured to indicate a display progress of the media content;

moving, in response to a first sliding operation for the first control, at least one element along a first direction, wherein a sliding direction of the first sliding operation indicates a display progress direction of the media content, and the first direction is opposite to the display progress direction, and the at least one element includes at least one thumbnail corresponding to the media content; and scaling, in response to a second sliding operation in a single direction for the first control, an object, the object including an image of the media content that is currently displayed within the media content display page, wherein the first control includes the at least one element;

wherein the moving the at least one element along the first direction includes:

determining a moving speed of the at least one element according to a sliding speed of the first sliding operation; and moving the at least one element along the first direction, which is opposite to the sliding direction of the first sliding operation, at the moving speed.

2. The method of claim 1, further comprising:

displaying a picture of the media content that corresponds to an element in the media content display page, wherein the element is an element displayed at a current position to which the first sliding operation slides.

3. The method of claim 1, wherein the moving the at least one element along the first direction includes:

moving, in response to not all of the at least one element being displayed within the media content display page, the at least one element along the first direction.

4. The method of claim 1, wherein the moving speed of the at least one element is different from the sliding speed of the first sliding operation.

5. The method of claim 4, wherein the moving speed of the at least one element is positively correlated with the sliding speed of the first sliding operation.

6. The method of claim 1, wherein the adjusting at least one of a position of at least one element in the first control and a display size of the object includes:

moving, in response to the first sliding operation sliding to a boundary position of an associated area corresponding to the first control, a first element or a last element of the first control into the media content display page for display.

7. The method of claim 1, wherein the scaling, in response to the second sliding operation for the first control, the object includes at least one of:

enlarging, in response to the second sliding operation along a second direction, the object;

reducing, in response to the second sliding operation along a third direction, the object.

8. The method of claim 1, wherein the scaling, in response to the second sliding operation for the first control, the object includes at least one of:

in a process for controlling the media content to perform display progress adjustment, enlarging, in response to the second sliding operation for switching to a second direction at an element of the first control, the object corresponding to the element;

reducing, in response to the second sliding operation in the second direction being switched to the second sliding operation in a third direction, the object corresponding to the element.

9. The method of claim 1, after scaling the object, the method further comprising:

in response to a destination of the second sliding operation being located in an associated area corresponding to the first control, detecting in real time and responding to a triggering operation for the first control, wherein the triggering operation starts from the destination, and the triggering operation includes an operation for controlling the media content to perform display progress adjustment.

10. The method of claim 9, wherein a continuous sliding is maintained while switching between the second sliding operation and the operation for controlling the media content to perform the display progress adjustment.

11. The method according to claim 1, wherein the scaling the object includes:

scaling, with a position as a center, the image of the media content that is currently displayed within the media content display page, wherein the position is a preset position of a picture where the image is located or a display position of the image.

12. The method of claim 11, before scaling the object, the method further comprising:

performing image recognition on the picture, and determining a total number of a candidate image contained in the picture, wherein the candidate image include an image of an object; and performing at least one of:

taking, in response to determining that the total number is zero, the preset position in the picture as the position;

taking, in response to determining that the total number is one, a display position of the candidate image in the picture as the position;

taking, in response to determining that the total number is greater than or equal to two, a display position of an image among the candidate image in the picture as the position.

13. The method of claim 1, further comprising:

displaying, in response to the second sliding operation sliding to any one of the element, a picture of the media content that corresponds to the any one of the element in the media content display page.

14. The method of claim 1, further comprising:

stopping, in response to an end of a trigger of the first sliding operation or the second sliding operation, displaying the first control; or stopping, in response to a duration from an end of a last trigger of the first sliding operation or the second sliding operation reaching a preset duration, displaying the first control.

15. The method of claim 1, wherein the displaying the media content and the first control corresponding to the media content on the media content display page includes:

displaying the media content and a second control corresponding to the media content in the media content display page;

switching, in response to a triggering operation for the second control, the second control to the first control.

16. An electronic device comprising:

at least one processor; and a memory communicatively coupled to the at least one processor; wherein, the memory stores a computer program executable by the at least one processor, and the computer program is executed by the at least one processor to cause the at least one processor to perform:

displaying a media content and a first control corresponding to the media content on a media content display page, wherein the first control is configured to indicate a display progress of the media content;

moving, in response to a first sliding operation for the first control, at least one element along a first direction, wherein a sliding direction of the first sliding operation indicates a display progress direction of the media content, and the first direction is opposite to the display progress direction, and the at least one element includes at least one thumbnail corresponding to the media content; and scaling, in response to a second sliding operation in a single direction for the first control, an object, the object including an image of the media content that is currently displayed within the media content display page, wherein the first control includes the at least one element;

wherein the moving the at least one element along the first direction includes:

determining a moving speed of the at least one element according to a sliding speed of the first sliding operation; and moving the at least one element along the first direction, which is opposite to the sliding direction of the first sliding operation, at the moving speed.

17. A non-transitory computer-readable storage medium storing a computer instruction, and the computer instruction, when executed by a processor, causes the processor to perform:

displaying a media content and a first control corresponding to the media content on a media content display page, wherein the first control is configured to indicate a display progress of the media content;

moving, in response to a first sliding operation for the first control, at least one element along a first direction, wherein a sliding direction of the first sliding operation indicates a display progress direction of the media content, and the first direction is opposite to the display progress direction, and the at least one element includes at least one thumbnail corresponding to the media content; and scaling, in response to a second sliding operation in a single direction for the first control, an object, the object including an image of the media content that is currently displayed within the media content display page, wherein the first control includes the at least one element;

wherein the moving the at least one element along the first direction includes:

determining a moving speed of the at least one element according to a sliding speed of the first sliding operation; and moving the at least one element along the first direction, which is opposite to the sliding direction of the first sliding operation, at the moving speed.

\* \* \* \* \*